(12) United States Patent
Hwang et al.

(10) Patent No.: US 9,383,503 B2
(45) Date of Patent: Jul. 5, 2016

(54) COLLIMATING LIGHT GUIDE PLATE, DIFFUSING UNIT, AND DISPLAY APPARATUS EMPLOYING THE SAME

(71) Applicant: Samsung Display Co., Ltd., Yongin-si (KR)

(72) Inventors: Seong-mo Hwang, Seongman-si (KR); Jee-hong Min, Seongman-si (KR); Moon-gyu Lee, Suwon-si (KR); Kyu-min Choe, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/511,601

(22) Filed: Oct. 10, 2014

(65) Prior Publication Data

US 2015/0022758 A1  Jan. 22, 2015

Related U.S. Application Data

(63) Continuation of application No. 12/033,906, filed on Feb. 20, 2008, now abandoned.

(30) Foreign Application Priority Data

Jul. 27, 2007  (KR) .................. 10-2007-0075910

(51) Int. Cl.
*G02F 1/13357* (2006.01)
*G02B 5/02* (2006.01)
*F21V 8/00* (2006.01)
(Continued)

(52) U.S. Cl.
CPC ............ *G02B 6/0053* (2013.01); *G02B 5/0226* (2013.01); *G02B 5/0242* (2013.01); *G02B 5/0278* (2013.01); *G02B 5/045* (2013.01); *G02B 6/0036* (2013.01); *G02F 1/1336* (2013.01); *G02F 1/133504* (2013.01); *G02F 1/133514* (2013.01); *G02F 1/133528* (2013.01); *G02B 6/0028* (2013.01); *G02B 6/0051* (2013.01)

(58) Field of Classification Search
None
See application file for complete search history.

(56) References Cited

U.S. PATENT DOCUMENTS 5,990,993 A  11/1999  Haas
6,552,763 B1  4/2003  Kouya
(Continued)

FOREIGN PATENT DOCUMENTS

EP  0762181 A1  3/1997
EP  1098209 A1  5/2001
(Continued)

OTHER PUBLICATIONS

Communication dated Jun. 13, 2013 issued by the Korean Intellectual Property Office in counterpart Korean Application No. 1020070075910.
(Continued)

*Primary Examiner* — Omar R Rojas
(74) *Attorney, Agent, or Firm* — Sughrue Mion, PLLC

(57) ABSTRACT

A diffusing unit includes: a polarizing plate; and a diffusing layer integrally provided on a surface of the polarizing plate without an air layer therebetween. By using a display apparatus employing a collimating light guide plate and the diffusing unit, the optical performances such as resolution and viewing angle can be improved. Also, because gray scale inversion and color shifts can be reduced or eliminated using collimated light, image quality of the display apparatus can be improved.

5 Claims, 14 Drawing Sheets

(51) Int. Cl.
*G02B 5/04* (2006.01)
*G02F 1/1335* (2006.01)

(56) References Cited

U.S. PATENT DOCUMENTS

| | | | | |
|---|---|---|---|---|
| 6,595,652 | B2 * | 7/2003 | Oda et al. | 362/609 |
| 7,201,510 | B2 * | 4/2007 | Yamashita et al. | 362/617 |
| 7,457,510 | B2 * | 11/2008 | Lee et al. | 385/146 |
| 7,889,289 | B2 * | 2/2011 | Misono et al. | 349/64 |
| 2001/0005243 | A1 | 6/2001 | Yamaguchi | |
| 2002/0015123 | A1 | 2/2002 | Iwata et al. | |
| 2002/0114149 | A1 | 8/2002 | Yamashita | |
| 2004/0130882 | A1 | 7/2004 | Hara | |
| 2004/0264911 | A1 | 12/2004 | Toeda | |
| 2005/0094295 | A1 | 5/2005 | Yamashita | |
| 2007/0030418 | A1 | 2/2007 | Ham | |

FOREIGN PATENT DOCUMENTS

| | | | | |
|---|---|---|---|---|
| JP | 1010513 | A | 1/1998 | |
| JP | 11160505 | A | 6/1999 | |
| JP | 11281818 | A | 10/1999 | |
| JP | 11326887 | A | 11/1999 | |
| JP | 2000-258612 | A | 9/2000 | |
| JP | 2002245824 | A | 8/2002 | |
| JP | 2002250914 | A | 9/2002 | |
| JP | 2003-57415 | A | 2/2003 | |
| JP | 2003232927 | A | 8/2003 | |
| KR | 1020050090203 | A | 9/2005 | |
| KR | 1020060038815 | A | 5/2006 | |
| KR | 1020060079031 | A | 7/2006 | |
| KR | 1020070002772 | A | 1/2007 | |
| WO | WO 2007052565 | A1 * | 5/2007 | G02B 5/02 |

OTHER PUBLICATIONS

Communication dated Jul. 30, 2013 issued by the Japanese Patent Office in counterpart Japanese Application No. 2008184800.
Communication dated Dec. 3, 2013, issued by the Japan Patent Office in counterpart Japanese Application No. 2008-184800.
Communication dated Jul. 1, 2010 from European Patent Office in counterpart application 08153238.4.
Partial English Translation of JP 2000-258162 A (Nishihda, Yokiyuki) Sep. 22, 2000 [on line], [retrieved on Aug. 17, 2010] Retrieved from the Industrial Property Digital Library of the Japan Patent Office using Internet < URL; http:/www.ipdl.inpit.go/jp/homepg_e.ipdl>.

* cited by examiner

COLLIMATING LIGHT GUIDE PLATE, DIFFUSING UNIT, AND DISPLAY APPARATUS EMPLOYING THE SAME

CROSS-REFERENCE TO RELATED PATENT APPLICATIONS

This is a Continuation Application of U.S. application Ser. No. 12/033,906 filed Feb. 20, 2008, which application claims priority from Korean Patent Application No. 10-2007-0075910, filed on Jul. 27, 2007, in the Korean Intellectual Property Office, the disclosures of which are incorporated herein in their entirety by reference.

BACKGROUND OF THE INVENTION

1. Field of the Invention

Apparatuses consistent with the present invention relate to a collimating light guide plate and a diffusing unit. A display apparatus employing the collimating light guide plate and the diffusing unit shows improved optical performances such as light transmittance, viewing angle, and resolution.

2. Description of the Related Art

As portable devices, such as mobile phones, personal digital assistants (PDAs), portable multimedia players (PMPs), digital multimedia broadcasting (DMB) systems, and notebook computers, have widely prevailed in recent years, there are demands for display apparatuses having low power consumption and high outdoor visibility. Such portable devices or display apparatuses display an image using a liquid crystal panel. In this case, however, a viewing angle is narrow because of a difference in an optical path between light propagating perpendicular to a screen and light obliquely propagating to the screen. To solve the problem, attempts have been made to increase a viewing angle using a compensating film. However, there still remain gray scale inversion and color shifts, especially in the oblique viewing angle.

For example, an illumination system in which light outcoupled or extracted from a light guide plate is collimated by a prism sheet is known to one skilled in the art as a possible solution. However, there are structural limitations in collimating light using the prism sheet and resolution is sacrificed. Also, other attempts have been made to increase a viewing angle using a diffusing plate. That is, the diffusing plate is disposed above an upper polarizing plate of a liquid crystal panel, and an air layer is formed between the diffusing plate and the upper polarizing plate. When light passes through the diffusing plate and the upper polarizing plate, the air layer acts as an interface, thereby reducing transmittance. When used outdoors, external light is reflected by the diffusing plate and the air layer, thereby reducing visibility as well.

SUMMARY OF THE INVENTION

Exemplary embodiments of the present invention provide a diffusing unit, and a display apparatus with improved transmittance and resolution by employing the diffusing unit.

The present invention also provides a display apparatus employing the diffusing unit, which can increase a viewing angle and reduce gray scale inversion and color shifts.

The present invention also provides a light guide plate which collimates and provides light to a liquid crystal panel, and a display apparatus with reduced phase difference caused by obliquely incident light by employing the light guide plate.

According to an aspect of the present invention, there is provided a diffusing unit comprising: a polarizing plate; and a diffusing layer integrally provided on a surface of the polarizing plate without an air layer therebetween.

The diffusing layer may also be formed by mixing beads with a binder so that the beads are partially exposed beyond the binder and coating the mixture on the polarizing plate.

The diffusing layer may be formed by beads mixed with a binder so that the beads are embedded in the binder and the mixture is coated on the polarizing plate.

The polarizing plate may comprise first and second tri-acetyl-cellulose (TAC) layers and a polyvinyl alcohol (PVA) layer disposed between the first and second TAC layers, wherein the diffusing layer is an adhesive layer disposed between the second TAC layer and the PVA layer.

According to another aspect of the present invention, there is provided a diffusing unit comprising: a first tri-acetyl-cellulose (TAC) layer; a second TAC layer disposed over the first TAC layer; a polyvinyl alcohol (PVA) layer disposed between the first and second TAC layers; and beads mixed in the second TAC layer.

The diameter of each of the beads may be less than a pitch between sub-pixels.

According to another aspect of the present invention, there is provided a display apparatus comprising: a backlight unit; a first polarizing plate which transmits light having a predetermined polarization among light emitted by the backlight unit; a liquid crystal layer which remains or changes the polarization state of light transmitted through the first polarizing plate; a color filter which transmits light having a predetermined wavelength among light transmitted through the liquid crystal layer; and a diffusing unit disposed on the color filter, and comprising a second polarizing plate and a diffusing layer integrally provided on a top surface of the second polarizing plate without an air layer between the second polarizing plate and the diffusing layer.

The display apparatus may further comprise a transparent substrate disposed between the color filter and the second polarizing plate, wherein, when the thickness from the transparent substrate to the diffusing layer is d, a pitch between sub-pixels is Ps, and the angle of luminance half width at half maximum (HWHM) of light incident on the transparent substrate is θ', the thickness d satisfies the following:

$$d < \{1.5\ Ps\}/\{\tan \theta'\}.$$

According to another aspect of the present invention, there is provided a light guide plate comprising: a first prismatic structure array arranged on a bottom surface of the light guide plate in a direction perpendicular to the optical axis of light emitted by a light source; and a second prismatic structure array arranged on a top surface of the light guide plate in a direction perpendicular to the direction of the first prismatic structure array to collimate incident light.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
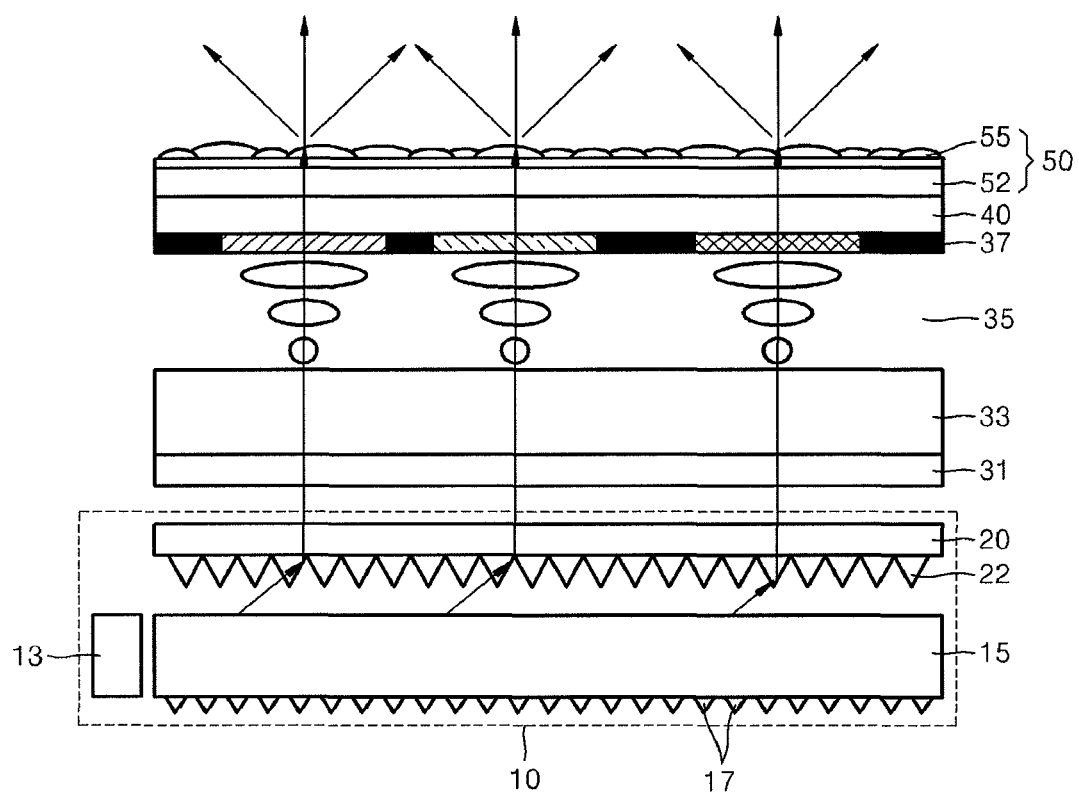
FIG. 1 is a cross-sectional view of a display apparatus according to an exemplary embodiment of the present invention.

FIG. 1 is a cross-sectional view of a display apparatus according to an exemplary embodiment of the present invention. Referring to FIG. 1, the display apparatus includes a backlight unit 10, a liquid crystal layer 35 forming an image using light emitted by the backlight unit 10, a first polarizing plate 31 disposed below the liquid crystal layer 35, and a diffusing unit 50 disposed over the liquid crystal layer 35.

The diffusing unit 50 includes a second polarizing plate 52 disposed over the liquid crystal layer 35 and a diffusing layer 55 integrally provided on a surface of the second polarizing plate 52 without an air layer therebetween. The diffusing layer 55 for diffusing light may be formed by coating a binder containing beads on a surface of the second polarizing plate 52. Since the second polarizing plate 52 and the diffusing layer 55 are integrally formed with each other with no interface therebetween in FIG. 1, light can be prevented from being reflected by the interface. Also, resolution can be improved by reducing the thickness of the diffusing unit 50 given a relationship between the total thickness from the upper part beyond the liquid crystal layer 35 to the diffusing layer 55 and the resolution of the display apparatus. The relationship between the total thickness and the resolution will be explained later.

Since a liquid crystal display (LCD) used in a mobile phone or a general display apparatus is a non-emissive flat panel display and thus cannot emit light by itself, an additional illumination source is required. A display apparatus using a liquid crystal panel forms an image by controlling light transmittance per pixel. The backlight unit 10 is installed as an illumination source on a rear surface of the liquid crystal panel.

Backlight units are divided into a direct light type and an edge light type according to the arrangement of a light source. Direct light type backlight units are configured such that a lamp installed under a liquid crystal panel directly emits light onto the liquid crystal panel. Edge light type backlight units are configured such that light is emitted to a liquid crystal panel using a light guide plate. The display apparatus of FIG. 1 can employ any of the direct light type backlight unit and the edge light type backlight unit although the backlight unit 10 of FIG. 1 is an edge light type backlight unit. The backlight unit 10 includes a light source 13 and a light guide plate 15 guiding light emitted by the light source 13 and providing light to the liquid crystal layer 35. The light source 13 may be a point light source, such as a light emitting diode (LED), or a line light source, such as a cold cathode fluorescent lamp (CCFL). The light guide plate 15 may have a prismatic structure array 17, formed on at least one of a top surface and a bottom surface of the light guide plate 15, to outcouple light at a high inclination angle and improve light use efficiency.

A redirecting prism sheet 20 is disposed over the light guide plate 15 and redirects light outcoupled by the light guide plate 15 to the normal direction of a screen. A prism array 22 is formed on a bottom surface of the redirecting prism sheet 20.

A first polarizing plate 31, a first transparent substrate 33, and the liquid crystal layer 35 are disposed over the redirecting prism sheet 20. A color filter 37 is disposed on the liquid crystal layer 35 to transmit color light having a predetermined wavelength therethrough among light transmitted through the liquid crystal layer 35. The liquid crystal layer 35 displays gray scale by controlling the amount of transmitted light per pixel, and the color filter 37 displays color images using a plurality of sub-pixels through which different color beams are transmitted.

The second transparent substrate 40 is disposed on the color filter 37, and the diffusing unit 50 including the second polarizing plate 52 and the diffusing layer 55 which are integrally formed with each other is disposed on the second transparent substrate 40. The diffusing layer 55 is closely adhered to the second polarizing plate 52 with no air layer therebetween.

Figure 2A:
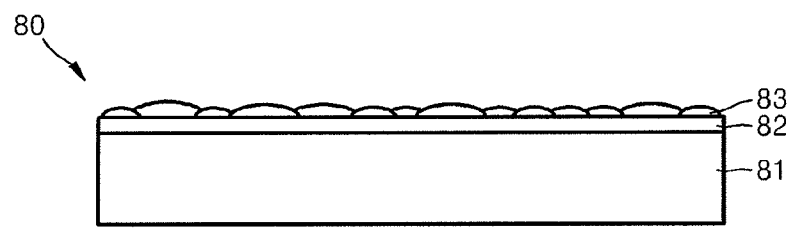
FIGS. 2A through 2E are cross-sectional views illustrating diffusing units according to exemplary embodiments of the present invention.

The second polarizing plate 52 and the diffusing layer 55 may be integrally formed with each other in various ways. FIGS. 2A through 2E are cross-sectional views illustrating diffusing units according to exemplary embodiments of the present invention. Referring to FIG. 2A, a diffusing unit 80 may be formed by mixing beads 83 formed of an inorganic or organic material, such as silica, polymethylmethaacrylate (PMMA), or polystyrene (PS), with a binder 82, coating the mixture on a surface of a polarizing plate 81, and curing the coating by heat or ultraviolet (UV) irradiation. The beads 83 may be formed to random heights on a surface of the binder 82, and may have the same diameter or different diameters. The diameter of each of the beads 83 may be less than a pitch between sub-pixels to prevent resolution degradation.

Figure 2B:
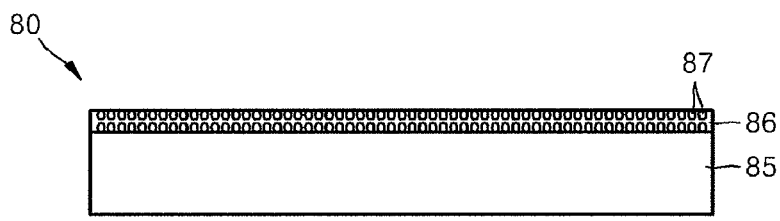
Figure 2C:
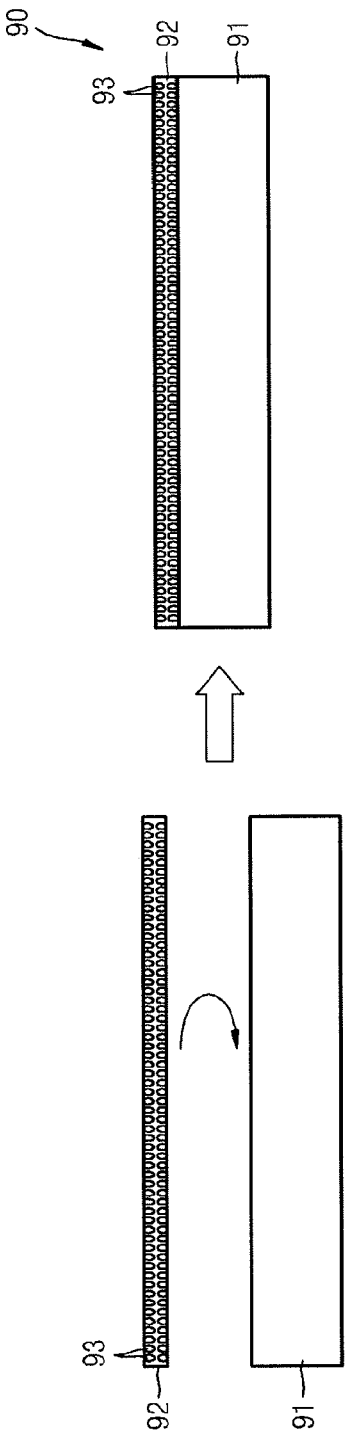

Referring to FIG. 2B, the diffusing unit 80 may be formed by mixing beads 87 with a binder 86 so that the beads 87 are embedded in the binder 86, coating the mixture on a surface of a polarizing plate 85, and curing the coating by heat or UV irradiation. Referring to FIG. 2C, a diffusing unit 90 may be formed by mixing beads 93 with a binder 92 so that the beads 93 are embedded in the binder 92, and adhering the binder 92 formed of an adhesive material on a surface of a polarizing plate 91.

Figure 2D:
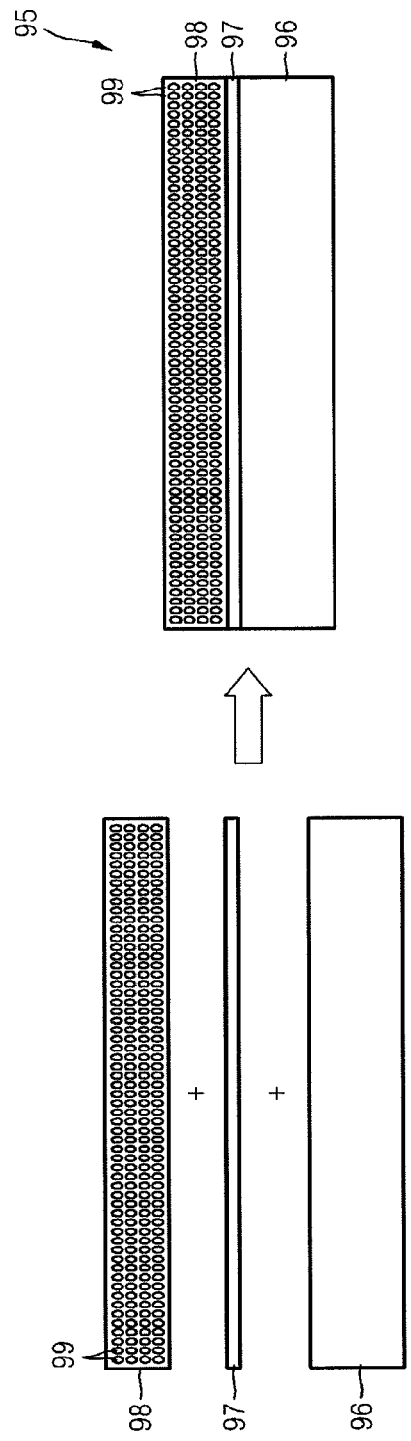
Figure 2E:
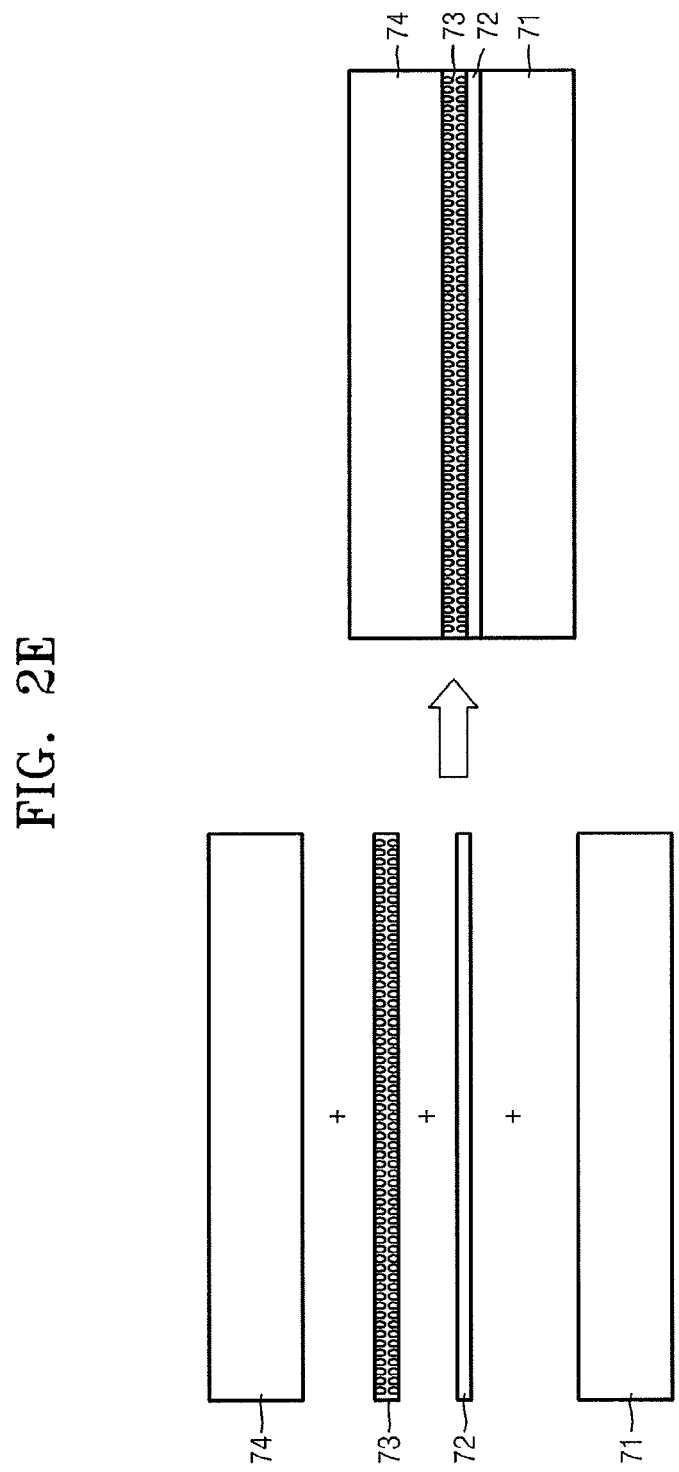

Referring to FIG. 2D, a diffusing unit 95, including first and second tri-acetyl-cellulose (TAC) substrates 96 and 98 and a polyvinyl alcohol (PVA) layer 97 disposed between the first and second TAC substrates 96 and 98, may be formed by adding beads 99 in a TAC solution during a manufacturing process of the second TAC substrate 98. Referring to FIG. 2E, a diffusing unit including first and second TAC substrates 71 and 74, a PVA layer 72, and an adhesive diffusing layer 73 disposed between the second TAC substrate 74 and the PVA layer 72 may be formed by mixing beads with a binder so that the beads are embedded in the binder. The second TAC substrate 74 and the PVA layer 72 are adhered to each other by the adhesive diffusing layer 73.

In the display apparatus of FIG. 1, the diffusing unit 50 includes the polarizing plate 52 formed by mixing beads with a binder and coating the mixture on the polarizing plate 52.

Figure 3:
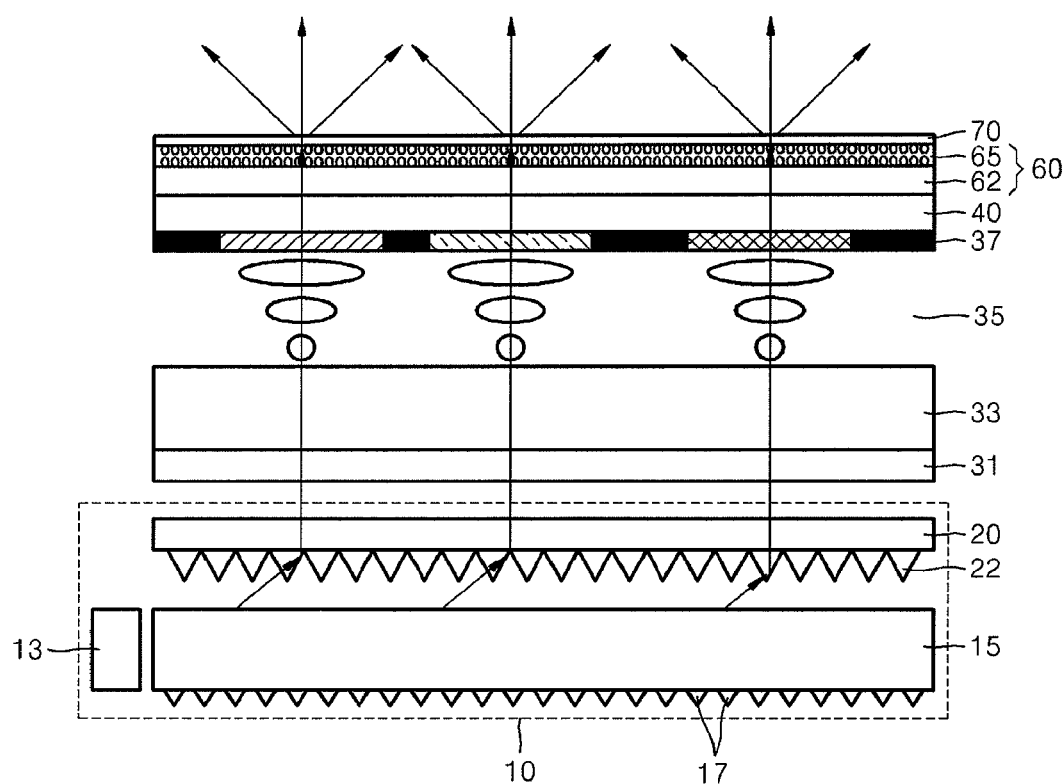
FIG. 3 is a cross-sectional view of a display apparatus according to another exemplary embodiment of the present invention.

FIG. 3 is a cross-sectional view of a display apparatus according to another exemplary embodiment of the present invention. Referring to FIG. 3, a diffusing unit 60 is formed as a volume scattering type like the diffusing units 80 and 90 in FIGS. 2B and 2C such that beads are embedded in a binder. An anti reflection layer 70 may be formed on the diffusing unit 60 to prevent external light from being reflected by the diffusing unit 60 and thus prevent visibility from being deteriorated.

The operation of the display apparatus of FIG. 1 or FIG. 3 will now be explained. Among light emitted by the light source 13, light having a predetermined propagation direction is totally reflected by the light guide plate 15, and light having other propagation directions is outcoupled to the outside of the light guide plate 15 to illuminate the liquid crystal layer 35. The prismatic structure array 17 formed on at least one of the top surface and the bottom surface of the light guide plate 15 collimates light by reducing the angle of light exiting the prismatic structure array 17. That is, light reflected by the prismatic structure array 17 is collimated and outcoupled at a high inclination angle. Thereafter, the collimated light is redirected by the redirecting prism sheet 20 to propagate perpendicular to the liquid crystal layer 35.

Light with a first polarization is transmitted through the first polarizing plate 31 and is incident on the liquid crystal layer 35. The liquid crystal layer 35 controls light transmittance according to the level of a voltage applied through the first and second transparent substrates 33 and 40. The liquid crystal layer 35 may be formed of a twisted nematic (TN) mode crystal, a vertical alignment (VA) mode crystal, or an electrically controlled birefringence (ECB) mode crystal. Light whose transmittance is controlled according to input signals by pixels in the liquid crystal layer 35 is transmitted through the color filter 37 as corresponding color light by sub-pixels. Since light with a predetermined polarization is diffused by the diffusing unit 50 or 60 in all viewing directions, a wide viewing angle can be achieved.

The second polarizing plate 52 and the diffusing layer 55 of FIG. 1 are integrally formed with each other in order to remove an interface between the second polarizing plate 52 and the diffusing layer 55, prevent external light from being reflected by the interface, and enhance outdoor visibility, and also in order to increase the resolution of the display apparatus. Resolution deteriorates when light transmitted through the liquid crystal layer 35 is transmitted through adjacent sub-pixels corresponding to the same color, resulting in blurriness. Accordingly, resolution closely relates to the distance of horizontal displacement of light within the second transparent substrate 40, the second polarizing plate 52, and the diffusing layer 55, after passing through the color filter 37.

Figure 4:
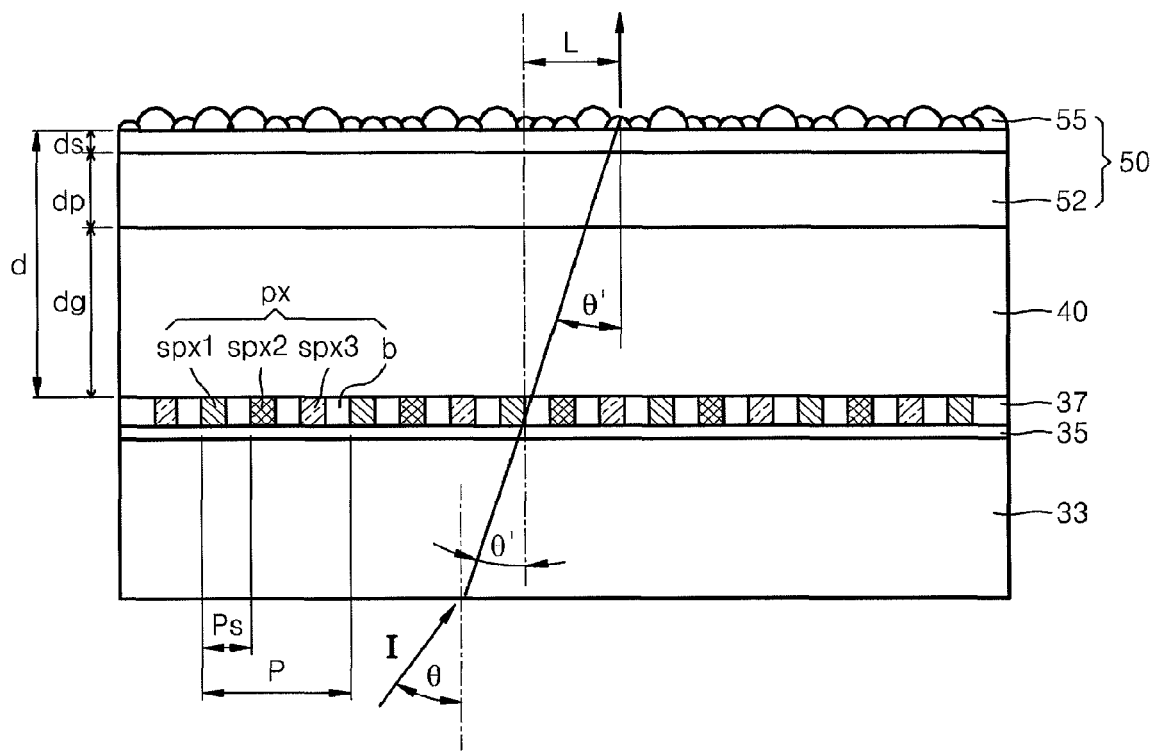
FIG. 4 is a cross-sectional view illustrating an optical path for obtaining a relationship between the total thickness including an upper transparent substrate and a diffusing unit and resolution in the display apparatus of FIG. 1, according to an exemplary embodiment of the present invention.

FIG. 4 is a cross-sectional view illustrating an optical path for light travelling from the first transparent substrate 33 to the diffusing unit 50 for explaining a relationship between the total thickness of the second transparent substrate 40, the second polarizing plate 52, and the diffusing layer 55 or 65 and the distance of horizontal displacement of light within the these plates. The thickness of the liquid crystal layer 35 is actually several μm which is negligible. The color filter 37 has a pattern comprising an array of pixels px each composed of first through third sub pixels spx1 through spx3. The first through third sub-pixels spx1 through spx3 transmit light of different colors. A black matrix b is formed between the sub-pixels. It is assumed that the thickness of the second transparent substrate 40 is dg, the thickness of the second polarizing plate 52 is dp, the thickness of the diffusing layer 55 is ds, the width of each pixel is P, and a pitch between sub-pixels is Ps. It is also assumed that the angle of luminance half width at half maximum (HWHM) of light I incident on the first transparent substrate 33 from the backlight unit 10 is θ, the angle of luminance HWHM of the light I incident on the color filter 37 or the second transparent substrate 40 is θ', and the total thickness of the second transparent substrate 40 and the diffusing unit 50 is d. In order to distinguish light passing through adjacent sub-pixels corresponding to the same color, the distance L of horizontal displacement of light in the second transparent substrate 40 and the diffusing unit 50 must satisfy L<1.5 Ps. When the distance L is greater than 1.5 Ps, light passing through the adjacent sub-pixels corresponding to the same color overlap and thus a region having light intensity greater than that from each sub-pixel is generated, thereby failing to distinguish the adjacent sub-pixels. Since L=d tan θ', the total thickness d of the second transparent substrate 40 and the diffusing unit 50 must satisfy $$d < \{1.5\ Ps\}/\{\tan \theta'\} \quad (1).$$

When the average refractive index of the second transparent substrate 40, the second polarizing plate 52, and the diffusing layer 55 is n, the angle θ of luminance HWHM and the angle θ' of luminance HWHM satisfy n sin θ'=sin θ. When it is assumed that the average refractive index of the diffusing unit and the transparent substrate is 1.5 and the angle θ of luminance HWHM is 10°, the angle θ' of luminance HWHM is approximately 6.6°. For example, when the width P of each pixel is 123 μm and the pitch Ps is 41 μm, typical values used in mobile LCDs, d<530 μm as obtained by Equation 1. When the thickness of the diffusing unit 50 is 230 μm (dp=200 μm and ds=30 μm), the thickness dg of the second transparent substrate 40 must be less than 300 μm. Since there is no air layer between the second polarizing plate 52 and the diffusing layer 55 in FIG. 4, the diffusing unit 50 or 60 can be made thin. Accordingly, as long as the total thickness of the second transparent substrate 40 and the diffusing unit 50 satisfy Equation 1, the thickness of the second transparent substrate 40 can increase by decreasing the thickness of the diffusing unit 50 or 60. It is difficult and expensive to make transparent glass thin. Accordingly, it is economical to increase the thickness of the second transparent substrate 40 as long as Equation 1 is satisfied.

Figure 5:
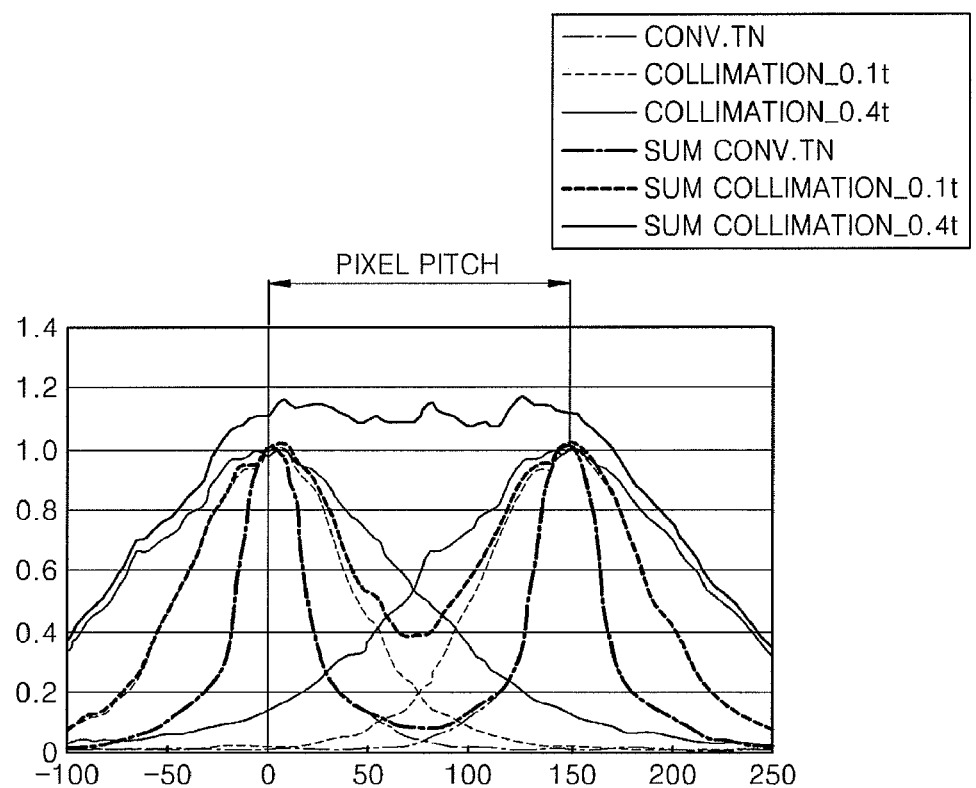
FIG. 5 is a graph illustrating a relationship between the thickness of an upper transparent substrate and image resolution for a conventional display apparatus and a display apparatus according to the present invention.

FIG. 5 is a graph illustrating a relationship between the thickness of a transparent substrate and image resolution. The horizontal axis represents the distance of horizontal displacement of light, and the vertical axis represents the normalized luminance of light from the display apparatus. When the thickness of the transparent substrate is 0.1 mm (0.1 t), adjacent sub-pixels can be distinguished. However, when the thickness of the transparent substrate is 0.4 mm (0.4 t), adjacent sub-pixels cannot be distinguished because Equation 1 is not satisfied.

Figure 6A:
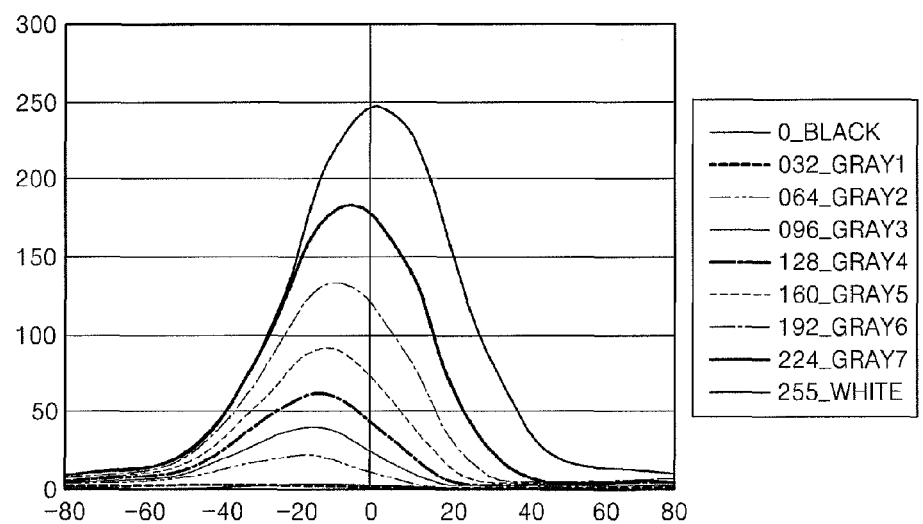
FIG. 6A is a graph illustrating gray scale inversion occurring in the conventional display apparatus.
Figure 6B:
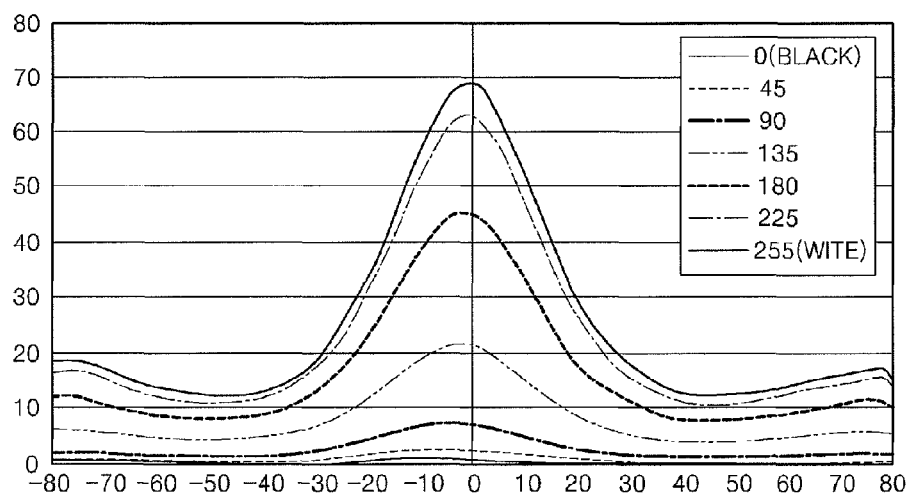
FIG. 6B is a graph illustrating gray scale inversion that does not occur in the display apparatus according to the present invention.

FIGS. 6A and 6B are graphs respectively illustrating gray scale inversion occurring in a conventional TN LCD, and gray scale inversion that does not occur in an LCD according to the present invention when the thickness of a transparent substrate is 100 μm. The graphs were obtained by measuring the angular luminance distributions of black, white and gray levels and quantitatively comparing the conventional TN LCD and the LCD according to the present invention in terms of whether there is gray scale inversion. Referring to FIG. 6A, the conventional TN LCD exhibits a strong occurrence of gray scale inversion in a vertical direction within the range of ±30 degrees. In the case of (−) inclination angles, gray scale inversion occurs at a level around white, whereas in the case of (+) inclination angles, gray scale inversion occurs at a level around black. On the contrary, referring to FIG. 6B, the display apparatus consistent with the present invention hardly exhibits gray scale inversion in all directions within the range of ±80 degrees, thereby achieving a clear image.

Figure 7A:
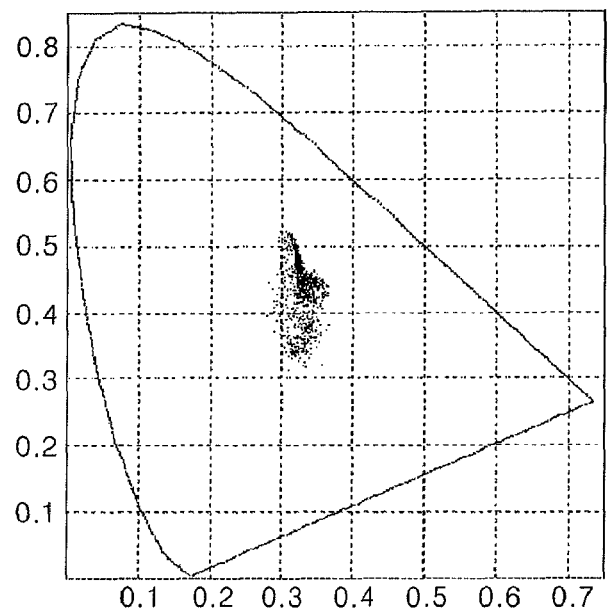
FIGS. 7A and 7B are graphs respectively illustrating color shifts by angles in color coordinates of an image in the conventional display apparatus and the display apparatus according to the present invention.
Figure 7B:
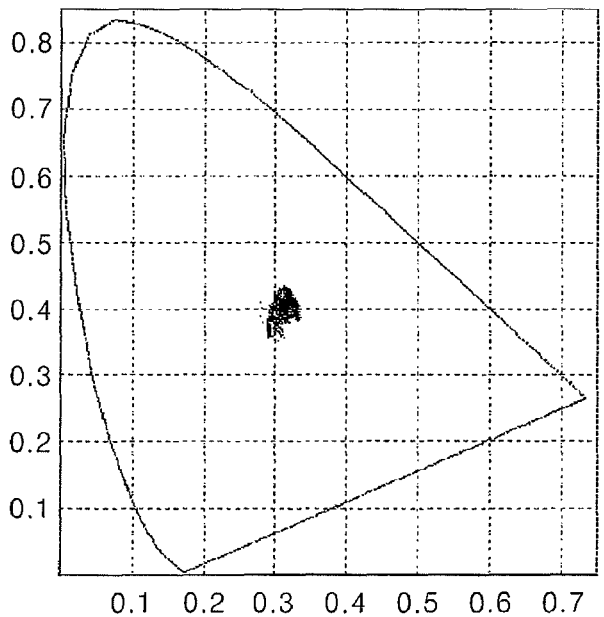

FIGS. 7A and 7B are graphs respectively illustrating color shifts by viewing angles up to 80 degrees in color coordinates for a specific point in the conventional TN LCD and the LCD according to the present invention. Referring to FIG. 7A, color shifts of $\Delta x=0.08$ and $\Delta y=0.21$ are generated, and referring to FIG. 7B, color shifts of $\Delta x=0.05$ and $\Delta y=0.08$, which are less than those of the conventional TN LCD, are generated.

Figure 8:
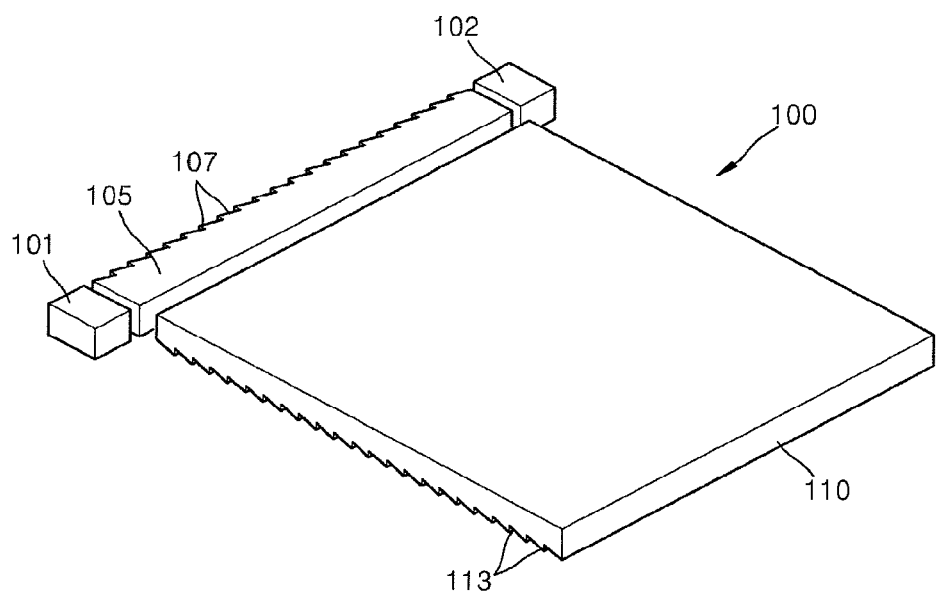
FIG. 8 is a perspective view of a backlight unit employed by a display apparatus according to another exemplary embodiment of the present invention.

FIG. 8 is a perspective view of a backlight unit 100 according to an exemplary embodiment of the present invention. The backlight unit 100 includes light sources 101 and 102, a light guide bar 105, and a light guide plate 110. The light sources 101 and 102 may be point light sources such as LEDs. The light guide bar 105 collimates light emitted by the light sources 101 and 102 and converts the point light sources 101 and 102 into a line light source. The light sources 101 and 102 may be disposed on both sides or only one side of the light guide bar 105. The light guide bar 105 has a prismatic structure array 107 that collimates light. The light guide plate 110 has a prismatic structure array 113 formed on a bottom surface thereof. The prismatic structure array 113 is arranged in a direction perpendicular to the longitudinal direction of the light guide plate in which light extracted from the light guide bar 105 propagates through the light guide plate 110.

Figure 9A:
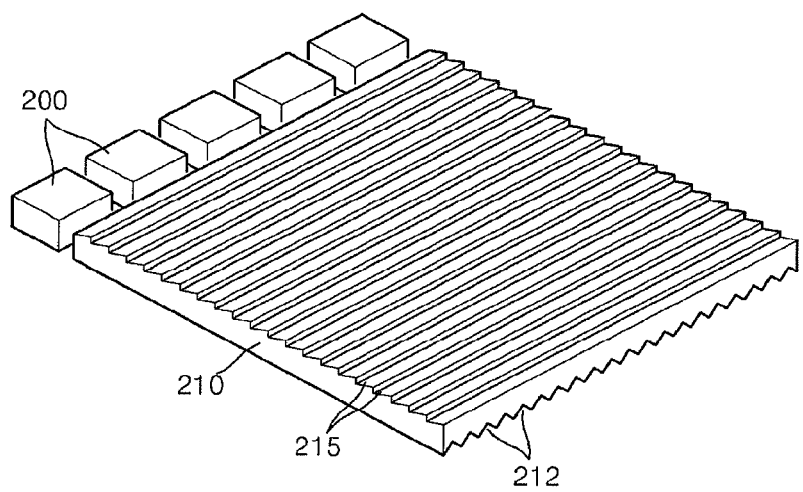
FIG. 9A is a perspective view of a light guide plate according to an exemplary embodiment of the present invention.
Figure 9B:
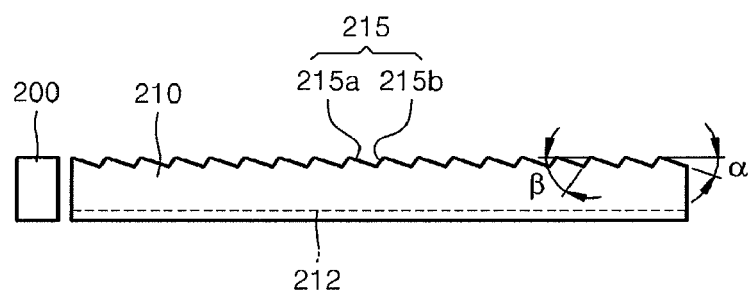
FIG. 9B is a cross-sectional view of the light guide plate of FIG. 9A.

FIGS. 9A and 9B illustrate a light guide plate 210 having light sources 200 disposed on a side thereof, according to an exemplary embodiment of the present invention. The light sources 200 are point light source, such as LEDs, and a plurality of light sources are arranged at predetermined intervals. The light guide plate 210 has a first prismatic structure array 212 arranged on a bottom surface thereof in a direction parallel to the optical axis of light emitted by the light sources 200 in which the light propagates through the light guide plate 210, and a second prismatic structure array 215 arranged on a top surface thereof in a direction perpendicular to the direction of the first prismatic structure array 212. The first prismatic structure array 212 acts as a collimator in a light source arrangement direction, that is, in the width direction (x direction) of the light guide plate 210. The second prismatic structure array 215 acts as a collimator in the longitudinal (y direction) of the light guide plate 210. Referring to FIG. 9B, the second prismatic structure array 215 has first and second prism surfaces 215a and 215b. It is assumed that the first prism surfaces 215a are inclined at an angle α with respect to a horizontal surface of the light guide plate 210 and the second prism surfaces 215b are inclined at an angle β with respect to the horizontal surface of the light guide plate 210. The first prismatic structure array 212 may have prism angles which are the same, and the second prismatic structure array 215 may have the angles α and β which vary according to positions to achieve uniform brightness from a light entrance part to a part opposite to the light entrance part of the light guide plate 210. For example, the angle α may increase as a position of the second prismatic structure array 215 is farther away from the light entrance part toward the opposite part, and the angle β may decrease as a position of the second prismatic structure array 215 is farther away from the light entrance part toward the opposite part. Numerical simulations and experiments were performed to determine a relationship between the angle of the first prismatic structure array 212 and the amount of extracted light and the degree of collimation by fixing the angles α and β respectively to 2 degrees and 45 degrees and varying the prism angle of the first prismatic structure array 212 from 180 degrees (flat), to 150 degrees, to 120 degrees, to 90 degrees. It is found that the amount of extracted light and the degree of collimation are the best when the prism angle of the first prismatic structure array 212 was 150 degrees.

Figure 10A:
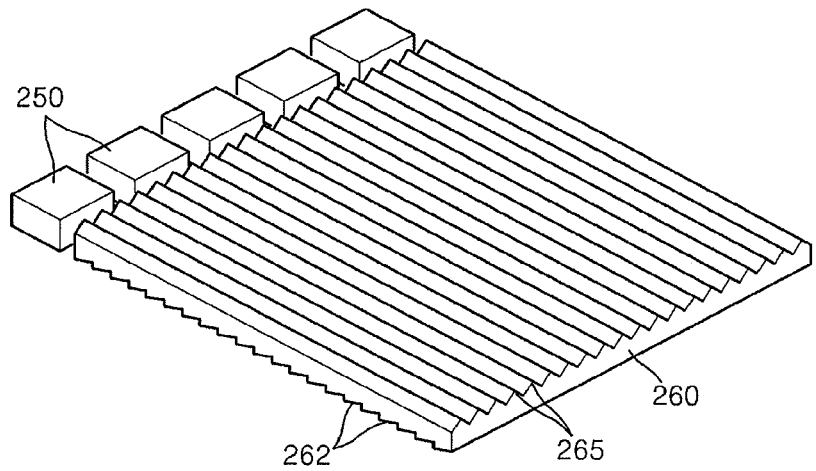
FIG. 10A is a perspective view of a light guide plate according to another exemplary embodiment of the present invention.
Figure 10B:
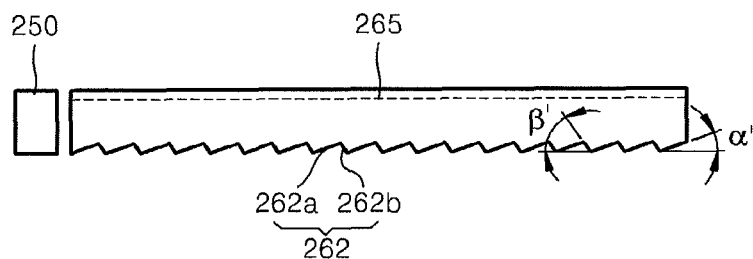
FIG. 10B is a cross-sectional view of the light guide plate of FIG. 10A.

FIGS. 10A and 10B illustrate a light guide plate 260, which has a plurality of light sources 250 disposed on a side thereof and collimates light emitted by the light sources 250, according to another exemplary embodiment of the present invention. Referring to FIG. 10A, the light guide plate 260 has a first prismatic structure array 262 arranged on a bottom surface thereof in a direction perpendicular to the optical axis of light emitted by the light sources 250, and a second prismatic structure array 265 arranged in a direction parallel to the optical axis. Referring to FIG. 10B, the first prismatic structure array 262 has first and second prism surfaces 262a and 262b. It is assumed that the first prism surfaces 262a are inclined at an angle α' with respect to a horizontal surface of the light guide plate 260 and the second prism surfaces 262b are inclined at an angle β' with respect to the horizontal surface of the light guide plate 260. The second prismatic structure array 265 may have prism angles which are the same, and the first prismatic structure array 262 may have the angles α' and β' which vary according to positions. Numerical simulations and experiments were performed to determine a relationship between the angle of the second prismatic structure array 265 and the amount of extracted light and the degree of collimation by fixing the angles α' and β' respectively to 2 degrees and 45 degrees and varying the prism angle of the second prism 265 from 180 degrees (flat), to 150 degrees, to 120 degrees, to 90 degrees. It is found that the amount of extracted light and the degree of collimation are the best when the prism angle of the second prismatic structure array 265 was 90 degrees.

The angle of luminance HWHM of light collimated by the light guide plate consistent with the present invention may be designed to be within the range of 15 degrees. Since the light collimated with the above-mentioned angle is outcoupled at a high inclination angle in the longitudinal direction of the light guide plate, an optical path can be easily changed by a conventional redirecting prism sheet such that the light can propagate perpendicular to a screen.

Figure 11:
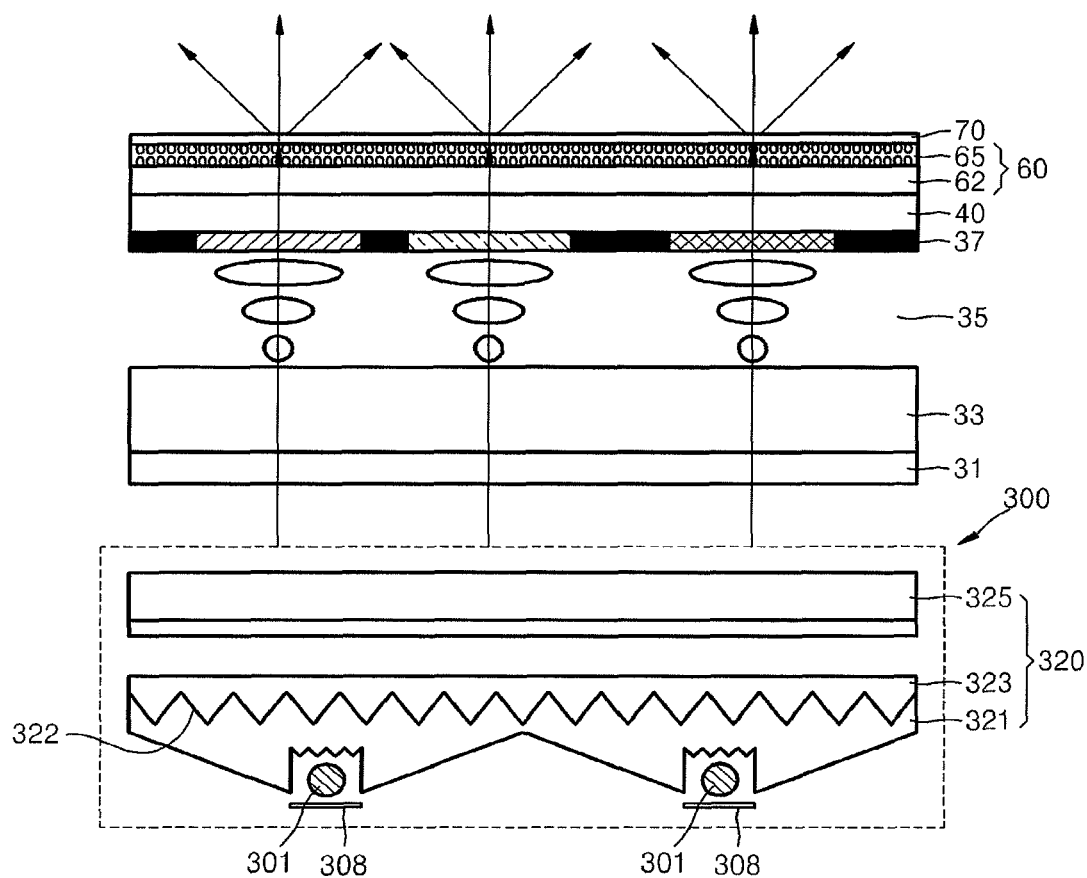
FIGS. 11 and 12 are cross-sectional views illustrating direct light type backlight units employed by a display apparatus according to exemplary embodiments of the present invention.
Figure 12:
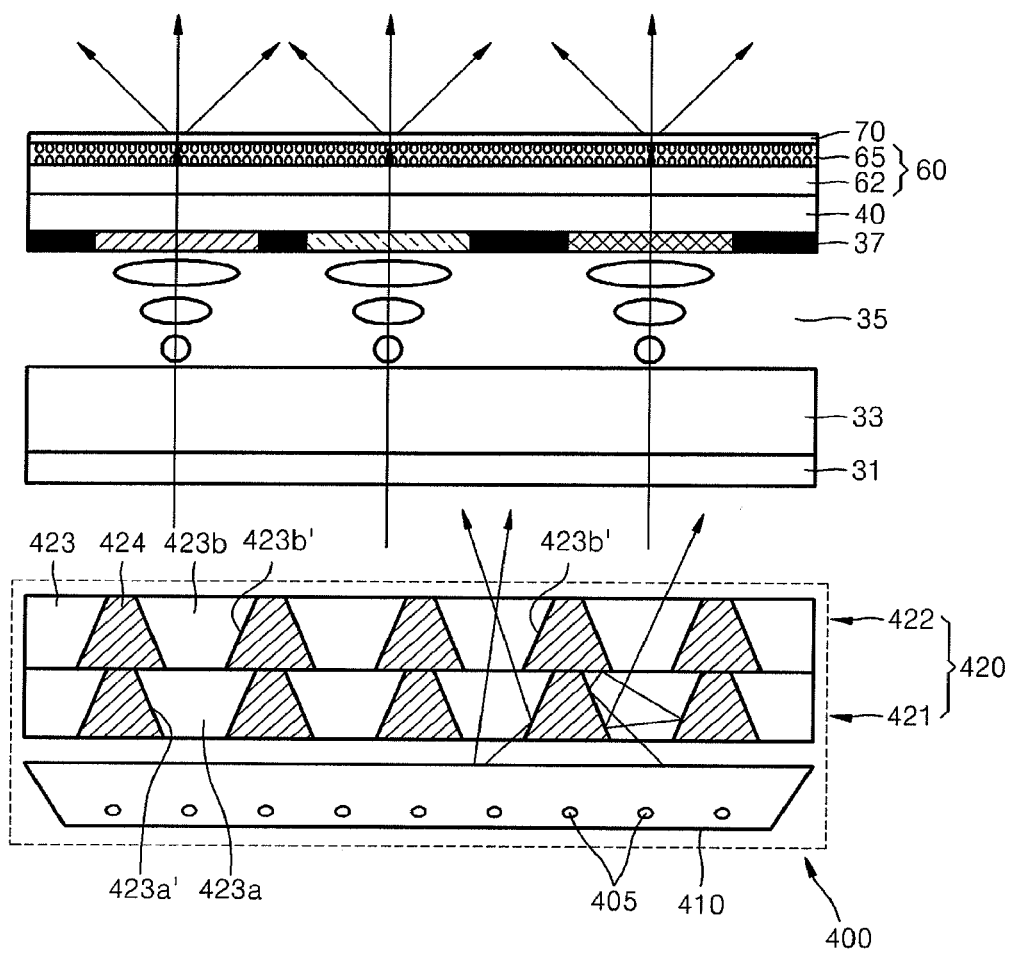

The display apparatus consistent with the present invention can be applied to a direct light type backlight unit as well as an edge light type backlight unit. FIGS. 11 and 12 are cross-sectional views of direct light type backlight units employed by a display apparatus according to exemplary embodiments of the present invention.

FIG. 11 is a cross-sectional view of a backlight unit 300 disclosed in U.S. patent application Ser. No. 11/830,165 filed by the inventor of the present invention, according to an exemplary embodiment of the present invention. Referring to FIG. 11, the backlight unit 300 includes a plurality of line light sources 301, a light guide unit 320 collimating light emitted by the line light sources 301, and reflective members 308. The light guide unit 320 includes a light guide body 321 in which the line light source 301 is received, a redirecting prism sheet 323, and an ordinary prism sheet 325.

The light guide body 321 and the redirecting prism sheet 323 are integrally formed with each other. That is, a refractive surface 322 of the light guide body 321 conforms with a pattern of the redirecting prism sheet 323, such that the light guide body 321 and the redirecting prism sheet 323 are closely engaged with each other. The light guide body 321 and the redirecting prism sheet 323 may be engaged by forming a linear ordinary prism pattern on the refractive surface 322 of the light guide body 321 and then forming the redirecting prism sheet 323 by direct molding. The refractive index of the redirecting prism sheet 323 may be higher than the refractive index of the light guide body 321 to prevent light from being totally reflected by the refractive surface 322 of the light guide body 321 while being transmitted from the light guide body 321 to the redirecting prism sheet 323.

Since the light guide body 321 and the redirecting prism sheet 323 are integrally formed with each other, light can be prevented from being totally reflected by the refractive surface 322 of the light guide body 321. Furthermore, since the number of assembled parts is reduced, a process of assembling the backlight unit 300 can be simplified.

FIG. 12 is a cross-sectional view of a backlight unit 400, which is disclosed in U.S. patent application Ser. No. 11/924,785 filed by the inventor of the present invention, employed by a display apparatus according to another exemplary embodiment of the present invention. Referring to FIG. 12, the backlight unit 400 includes light sources 405 and a collimator 420. A reflector 410 may be disposed around the light sources 405 to reflect light emitted by the light sources 405 to a panel.

The collimator 420 includes a first plate member 421 and a second plate member 422 which are adhered to each other. The collimator 420 has a plurality of light-passing areas 423 and a plurality of non-passing areas 424 formed between the light-passing areas 423. The light-passing areas 423 include first light-passing areas 423a of the first plate member 421 and second light-passing areas 423b of the second plate member 422. Inner surfaces of the first light-passing areas 423a and the second light-passing areas 423b are reflective surfaces 423a' and 423b'. The non-passing areas 424 may have an additional mirror or a minor structure to re-reflect incident light toward the light sources 405 or the reflector 410.

The first light-passing areas 423a and the second light-passing areas 423b widen in a light advancing direction, and thus the inner surfaces of the first light-passing areas 423a and the second light-passing areas 423b, that is, the reflective surfaces 423a' and the 423b', are inclined. Accordingly, among light incident through the first light-passing areas 423a, light incident at a relatively narrow angle is directly propagated through the second light-passing areas 423b, and part of light incident at a wide angle is reflected once or more times by the reflective surfaces 423a' and 423b' of the first light-passing areas 423a and the second light-passing areas 423b and then propagated. Light having certain incident angles is reflected several times by the reflective surface 423a' of the first light-passing areas 423a and then propagated through the second light-passing areas 423b.

In this structure, light incident at a first angle on the collimator 420 is extracted from the collimator 420 at a second angle less than the first angle and then incident on the liquid crystal panel. The light-passing areas 423 and the non-passing areas 424 may be designed in various ways.

Since a diffusing unit 60 in FIGS. 11 and 12 is the same as the diffusing unit 60 of FIG. 3 in that a second polarizing plate 62 and a diffusing layer 65 are integrally formed with each other, a detailed explanation thereof will not be given.

Figure 13A:
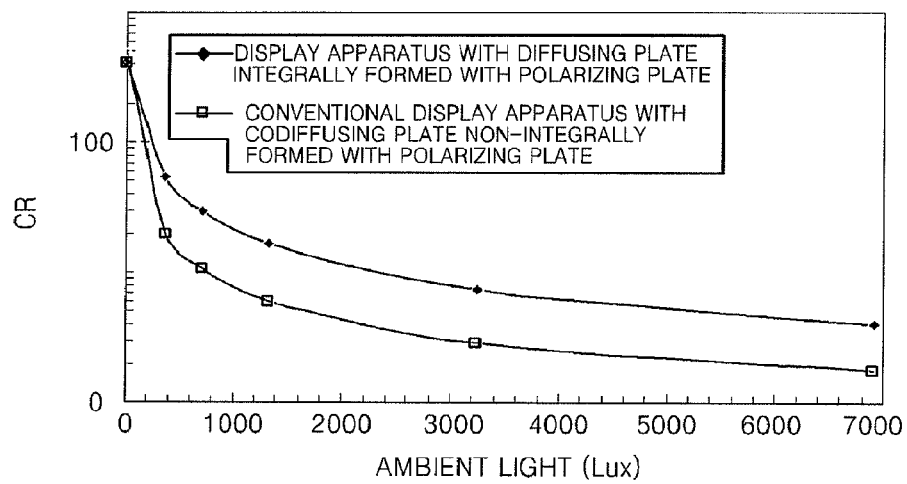
FIG. 13A is a graph illustrating a relationship between ambient light and contrast ratio (CR) for a display apparatus including a diffusing unit where a diffusing layer and a polarizing plate are integrated with each other and a display apparatus including a diffusing layer and a polarizing plate which are non-integrally formed with each other, according to an exemplary embodiment of the present invention.
Figure 13B:
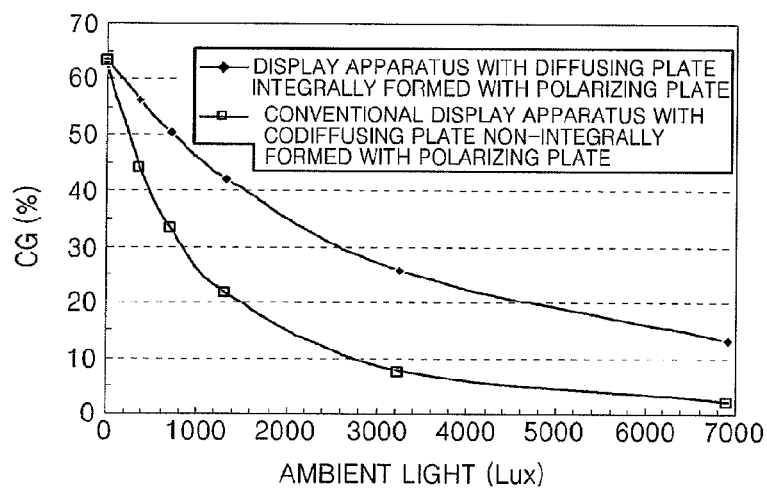
FIG. 13B is a graph illustrating a relationship between ambient light and color gamut (CG) for the display apparatus including the diffusing unit where a diffusing layer and the polarizing plate are integrally formed with each other and the display apparatus including the diffusing layer and the polarizing plate which are non-integrally formed with each other.

FIGS. 13A and 13B are graphs respectively illustrating a relationship between ambient light and contrast ratio (CR) and a relationship between ambient light and color gamut (CG) for a conventional display apparatus in which a diffusing layer and a polarizing plate are non-integrally formed with each other and a display apparatus according to the present invention in which a diffusing plate and a polarizing plate are integrally formed with each other, according to an embodiment of the present invention. Although an LCD has a CR of about 500:1 in a dark room, when the LCD is actually exposed to external light, the amount of light reflected by a surface is increased due to the external light, thereby reducing the contrast ratio. Also, the external light, which is white light, is reflected by the surface and mixed with color light passing through a color filter, thereby narrowing RGB color coordinates and a CG. Referring to FIG. 13A, the display apparatus with the diffusing layer integrally formed with the polarizing plate according to the present invention has a CR reduction due to external light less than that of the conventional display apparatus with the diffusing layer non-integrally formed with the polarizing plate. Referring to FIG. 13B, the display apparatus with the diffusing layer integrally formed with the polarizing plate according to the present invention has a CG reduction due to the external light less than that of the conventional display apparatus with the diffusing layer non-integrally formed with the polarizing plate.

This is because, when the diffusing layer is separated from the polarizing plate, an air layer is formed between the diffusing layer and the polarizing plate, and thus the number of interfaces by which external light is to be reflected is increased, thereby increasing the reflectance of external light and lowering visibility, as compared with the display apparatus with the diffusing layer integrally formed with the polarizing plate.

The diffusing unit and the display apparatus employing the same according to the present invention can improve resolution and achieve a wide viewing angle by integrally forming the diffusing layer with the polarizing plate, can prevent gray scale inversion and reduce color shifts using collimated light, can reduce the thickness and cost of the liquid crystal panel by integrating the diffusing layer with the polarizing plate, and can improve outdoor visibility by reducing the reflectance of external light.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display apparatus comprising:
   a backlight unit;
   a first polarizing plate which transmits light having a predetermined polarization;
   a liquid crystal layer, disposed over the first polarizing plate and configured to form an image with light transmitted by the first polarizing plate;
   a color filter, disposed over the liquid crystal layer, which transmits light having a predetermined wavelength;
   a diffusing unit disposed over the color filter, the diffusing unit comprising a second polarizing plate and a diffusing layer integrally provided on a top surface of the second polarizing plate, wherein no air layer is present between the second polarizing plate and the diffusing layer; and
   a light guide plate comprising a first prismatic structure array, comprising a plurality of prisms extending in a direction perpendicular to a direction of light emitted by the backlight unit, and a second prismatic structure array comprising a plurality of prisms extending in a second direction parallel to a direction of light emitted by the backlight unit;
   wherein the first prismatic structure array is disposed on one of a top surface of the light guide plate and a bottom surface of the light guide plate and the second prismatic structure array is disposed on another one of the top surface of the light guide plate and the bottom surface of the light guide plate; and
   further comprising a transparent substrate disposed between the color filter and the diffusing unit, wherein, a thickness from the transparent substrate to the diffusing layer is d, a pitch between sub-pixels of the display apparatus is Ps, and an angle of luminance half width at half maximum (HWHM) of light transmitted through the transparent substrate is $\theta'$, and the thickness d satisfies:
   $$d < \{1.5\, Ps\}/\{\tan \theta'\}.$$

2. A display apparatus comprising:
   a backlight unit;
   a first polarizing plate which transmits light having a predetermined polarization;
   a liquid crystal layer, disposed over the first polarizing plate and configured to form an image with light transmitted by the first polarizing plate;
   a color filter, disposed over the liquid crystal layer, which transmits light having a predetermined wavelength;
   a diffusing unit disposed over the color filter, the diffusing unit comprising a second polarizing plate and a diffusing layer integrally provided on a top surface of the second polarizing plate, wherein no air layer is present between the second polarizing plate and the diffusing layer; and
   a light guide plate comprising a first prismatic structure array, comprising a plurality of prisms extending in a direction perpendicular to a direction of light emitted by the backlight unit, and a second prismatic structure array comprising a plurality of prisms extending in a second direction parallel to a direction of light emitted by the backlight unit;
   wherein the first prismatic structure array is disposed on one of a top surface of the light guide plate and a bottom surface of the light guide plate and the second prismatic structure array is disposed on another one of the top surface of the light guide plate and the bottom surface of the light guide plate; and
   wherein the diffusing unit comprises:
   a first tri-acetyl-cellulose (TAC) layer;
   a second TAC layer disposed over the first TAC layer;
   a polyvinyl alcohol (PVA) layer disposed between the first and second TAC layers; and
   beads mixed in the second TAC layer.

3. The display apparatus of claim 2, wherein a diameter of each of the beads is less than a pitch between sub-pixels of the display apparatus.

4. The display apparatus of claim 1, wherein each of the plurality of prisms of the first prismatic structure array comprises a first prism surface facing the light source and a second prism surface,
   wherein the first prism surface is are inclined at an angle of less than 5 degrees and the second prism surface is inclined at an angle of greater than 40 degrees.

5. The display apparatus of claim 1, wherein an angle of luminance half width at half maximum (HWHM) of light outcoupled by the light guide plate is within a range of 15 degrees.

* * * * *